(12) United States Patent
Shiohara et al.

(10) Patent No.: US 9,672,456 B2
(45) Date of Patent: *Jun. 6, 2017

(54) IMAGE PROCESSING DEVICE, PRINTING DEVICE, AND IMAGE PROCESSING METHOD

(71) Applicant: Seiko Epson Corporation, Tokyo (JP)

(72) Inventors: Susumu Shiohara, Shiojiri (JP); Toshifumi Yamaji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,397

(22) Filed: Feb. 18, 2016

(65) Prior Publication Data

US 2016/0162763 A1 Jun. 9, 2016

Related U.S. Application Data

(60) Continuation of application No. 14/678,063, filed on Apr. 3, 2015, and a division of application No. (Continued)

(30) Foreign Application Priority Data

Jan. 25, 2012 (JP) ................................. 2012-012956

(51) Int. Cl.
*H04N 1/60* (2006.01)
*G06K 15/02* (2006.01)
(Continued)

(52) U.S. Cl.
CPC ............ *G06K 15/1894* (2013.01); *B41J 3/01* (2013.01); *B41J 3/4075* (2013.01); *B42D 15/00* (2013.01); *B42D 15/0053* (2013.01); *G06F 3/00* (2013.01); *G06F 3/1205* (2013.01); *G06F 3/1206* (2013.01); *G06F 3/1251* (2013.01); *G06F 3/1257* (2013.01); *G06K 15/1889* (2013.01); *H04N 1/32149* (2013.01); *H04N 1/60* (2013.01); *G06F 3/125* (2013.01)

(58) Field of Classification Search
None
See application file for complete search history.

(56) References Cited

U.S. PATENT DOCUMENTS 5,608,542 A 3/1997 Krahe et al.
7,460,252 B2 12/2008 Campbell et al.
(Continued)

FOREIGN PATENT DOCUMENTS

EP 1 394 753 A1 3/2004
JP 06-328790 A 11/1994
(Continued)

*Primary Examiner* — Kimberly A Williams
(74) *Attorney, Agent, or Firm* — Nutter McClennen & Fish LLP; John J. Penny, Jr.; Santiago Velez

(57) ABSTRACT

An image processing device that changes the output format of the generated printout can dynamically change the output format of the printout using print data from an existing system. An image processing device that executes a process to change the output format of a printout has an output format selector that selects a template determining the format of the printout based on information contained in the print data for the printout, and a print data generator that changes the print data according to the selected template.

9 Claims, 4 Drawing Sheets

Related U.S. Application Data

13/748,850, filed on Jan. 24, 2013, now Pat. No. 9,013,752.

(51) Int. Cl.
- *B41J 3/407* (2006.01)
- *G06F 3/12* (2006.01)
- *B42D 15/00* (2006.01)
- *H04N 1/32* (2006.01)
- *G06F 3/00* (2006.01)
- *B41J 3/01* (2006.01)

(56) References Cited

U.S. PATENT DOCUMENTS

| | | |
|---|---|---|
| 9,013,752 B2 | 4/2015 | Shiohara et al. |
| 2002/0113994 A1 | 8/2002 | Smith et al. |
| 2003/0020954 A1 | 1/2003 | Udom et al. |
| 2003/0113151 A1 | 6/2003 | Yokoyama et al. |
| 2004/0145769 A1 | 7/2004 | Collier et al. |
| 2004/0167974 A1 | 8/2004 | Bunn et al. |
| 2008/0204809 A1 | 8/2008 | Miyashita et al. |
| 2009/0063942 A1 | 3/2009 | Laderman |
| 2010/0060909 A1 | 3/2010 | Conescu et al. |
| 2010/0073729 A1 | 3/2010 | Koyatsu et al. |
| 2011/0026835 A1 | 2/2011 | Ptucha et al. |
| 2013/0188207 A1 | 7/2013 | Shiohara et al. |
| 2014/0119673 A1 | 5/2014 | Rathnavelu et al. |
| 2015/0213345 A1 | 7/2015 | Shiohara et al. |

FOREIGN PATENT DOCUMENTS

| | | |
|---|---|---|
| JP | 2000-056685 A | 2/2000 |
| JP | 2000-341458 A | 12/2000 |
| JP | 2002-014792 A | 1/2002 |
| JP | 2003-150054 A | 5/2003 |
| JP | 2005-316857 A | 11/2005 |
| JP | 2006-338251 A | 12/2006 |
| JP | 2008-210217 A | 9/2008 |
| JP | 2010-238039 A | 10/2010 |

IMAGE PROCESSING DEVICE, PRINTING DEVICE, AND IMAGE PROCESSING METHOD

The present application is a Continuation of U.S. application Ser. No. 14/678,063, filed on Apr. 3, 2015, which is a Divisional of U.S. patent application Ser. No. 13/748,850, filed on Jan. 24, 2013, now U.S. Pat. No. 9,013,752, issued on Apr. 21, 2015. Priority is claimed under 35 U.S.C. §119 to Japanese Application No. 2012-012956 filed on Jan. 25, 2012. The entire teachings of these applications are incorporated by reference herein.

BACKGROUND

1. Technical Field

The present invention relates to image processing devices for changing the output format of the printed output, and relates more particularly to image processing devices that can dynamically change the output format of the printout using print data from an existing system.

2. Related Art

Business printers such as receipt printers used in POS systems, and label printers for printing product labels and shipping labels, for example, are widely used. A problem with such printers and printer systems, however, is that the appearance of the printout produced by existing installed devices is typically limited, and improvement is often desired. A common desire is to add color to simple black and white documents.

Because replacing the entire system to accomplish this is both expensive and time-consuming, as well as disruptive to business, configuring the system using existing system components as much as possible is desirable.

Technologies for improving the printing system as described above have been proposed in the past. Japanese Unexamined Patent Appl. Pub. JP-A-H06-328790, for example, describes a method of easily adding color to the printout using monochrome text data. U.S. Pat. No. 7,460,252 B2 describes a printing system that can add graphic effects to printout from a POS printer.

The technology taught in JP-A-H06-328790, however, colorizes text and images that are already present, and is unable to add new image objects, or to change the overall format or appearance of the printout by specifying the overall color or background image, for example.

The technology taught in U.S. Pat. No. 7,460,252 B2 is directed to processing sales receipts, and more particularly to processing specific strings to add graphic effects when triggered by detecting the specific strings in the original print data, and is silent about changing the overall appearance of the printout. In addition, because the process is not executed when the specific string is not found in the original print data or when a complete string match is not found, adding graphic effects is not flexible. The search process is also time-consuming.

When printing labels, however, the size of the printout is usually constant, and the ability to flexibly change the overall appearance or output format of the printout, including easily changing the output format of the printout and not changing the output format of printouts of the same type depending on specific conditions, is desirable.

SUMMARY

An image processing device for changing the appearance of a printout according to at least one embodiment of the present invention can dynamically change the overall appearance of the printout using print data from an existing system.

A first aspect of at least one embodiment of the invention is an image processing device that executes a process that changes the output format of a printout, the image processing device including an output format selector that selects a template determining the format of the printout based on information contained in print data for the printout; and a print data generator that changes the print data according to the selected template.

In another preferred aspect of at least one embodiment of the invention, the information contained in the print data is information for a barcode printed in the printout.

In another preferred aspect of at least one embodiment of the invention, the output format selector selects one template from among a plurality of prepared templates.

In another preferred aspect of at least one embodiment of the invention, the template includes at least foreground color, background color, or background image information.

In another preferred aspect of at least one embodiment of the invention, plural templates are prepared for the same type of printout.

In another preferred aspect of at least one embodiment of the invention, the print data is data for monochrome printing.

Another aspect of at least one embodiment of the invention is a printing device that changes the output format of a printout when printing, the printing device including: an output format selector that selects a template determining the format of the printout based on information contained in print data for the printout; a print data generator that changes the print data according to the selected template; and a printing unit that prints according to the changed print data.

Another aspect of at least one embodiment of the invention is an image processing method for changing the output format of a printout, the image processing method comprises: selecting a template determining the format of the printout based on information contained in print data for the printout; and changing the print data according to the selected template.

Other objects and attainments together with a fuller understanding of the invention will become apparent and appreciated by referring to the following description and claims taken in conjunction with the accompanying drawings.

DESCRIPTION OF EMBODIMENTS

Figure 1:
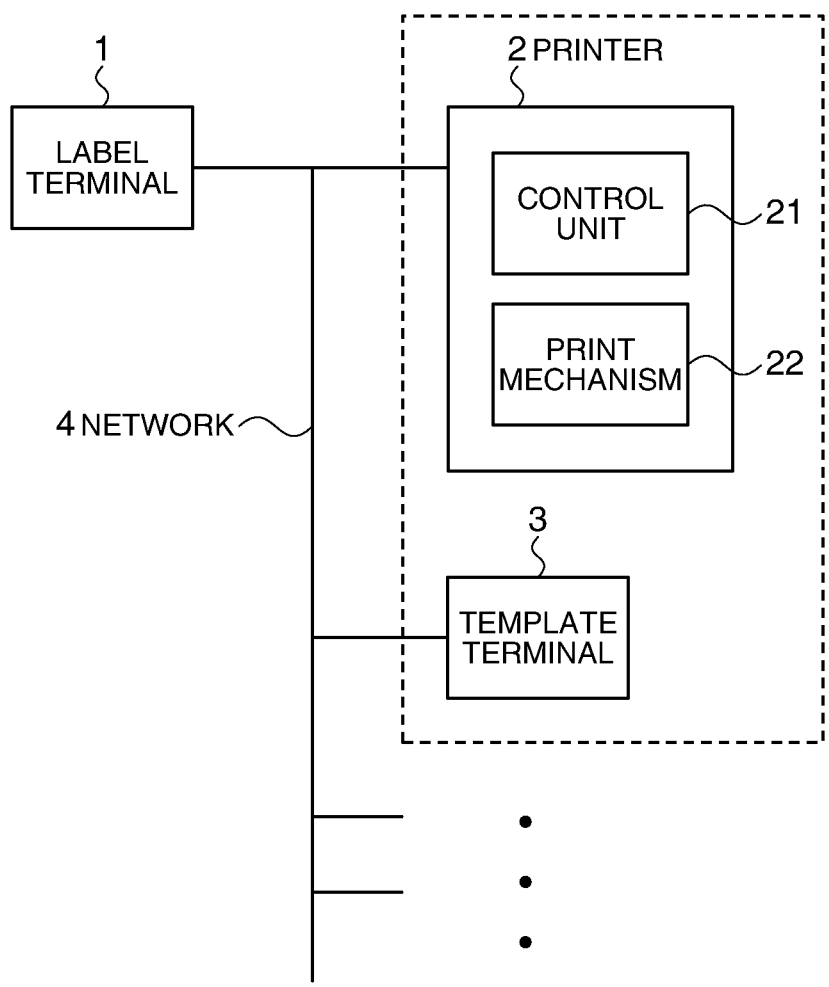
FIG. 1 shows a network related to a preferred embodiment of a printer 2 using an image processing device according to the invention.

A preferred embodiment of the present invention is described below with reference to the accompanying figures. The technical scope of the invention is not limited to the following embodiment. Identical or similar parts are also identified by the same reference numerals in the accompanying figures.

FIG. 1 is a block diagram of a network related to a preferred embodiment of a printer that uses an image processing device according to the invention. The printer 2 shown in FIG. 1 is a printer according to this embodiment of the invention. This printer 2 receives print data for a previously installed monochrome printer, selects an appropriate template from among a group of plural templates (formatting information for the printout) that are prepared for the particular printout (such as a label) produced by the print data based on barcode data contained in the print data, and then prints using the selected template. This enables colorizing the printout, changing the general appearance of the printout, and changing the output format based on conditions (such as the time) defined for printouts of the same type, for example, and thereby enables enhancing the functionality of the printout. This enhanced functionality can also be achieved easily in an existing monochrome printing system.

FIG. 1 shows the configuration of a label printing system including the printer 2, a label terminal 1, a template terminal 3, and a network 4. This label printing system is constructed by modifying a previously deployed monochrome label printing system ("old system" below).

The label terminal 1 is a device used in the old system, and is the host device that sends print requests to the printer 2. The label terminal 1 may be a personal computer to which an application for generating labels (an application program) and a driver for the monochrome printer installed in the old system (printer driver) have been installed. When printing is requested, the label terminal 1 sends the monochrome print data generated by the driver over the network 4 to the printer 2. The label terminal 1 and printer 2 could be connected directly through a standard USB or RS-232 cable instead of over the network 4.

The network 4 is a LAN (local area network) connecting devices including the label terminal 1, printer 2, and template terminal 3. The network 4 may also be part of the old system.

As described above, the printer 2 changes the output format of the received print data and outputs a printout, and in this embodiment is an inkjet line printer. In this embodiment, the printer 2 is a new printer that is installed when upgrading the system, and prints labels based on print requests (print data) received from the label terminal 1.

As shown in FIG. 1, the printer 2 has a control unit 21 and a print mechanism 22. The control unit 21 controls printer 2 operation and runs the process of changing the output format as described below. This process is a unique feature of the printer 2, and is described in detail below. The control unit 21 is equivalent to the image processing device of the invention.

Although not shown in the figure, the control unit 21 typically includes a CPU, RAM, ROM, hard disk drive, NVRAM, and ASIC, and processes run by the control unit 21 are executed by the CPU or ASIC operating according to a program stored in ROM.

The print mechanism 22 is the part that prints the printout (labels) on the print medium (such as paper) according to commands from the control unit 21. The print mechanism 22 can include a printhead with plural nozzles that eject ink, and a conveyance unit that conveys the print medium.

The template terminal 3 is a terminal device for creating and editing the templates used by the printer 2, and the user accesses the printer 2 from the template terminal 3 over the network 4 to read and register (save) template data. The template terminal 3 can be configured using a personal computer, for example, and has software for producing and editing templates. The template terminal 3 is also newly installed as part of the system upgrade. The parts enclosed in the dotted line in FIG. 1 are therefore devices that are newly installed.

Figure 2:
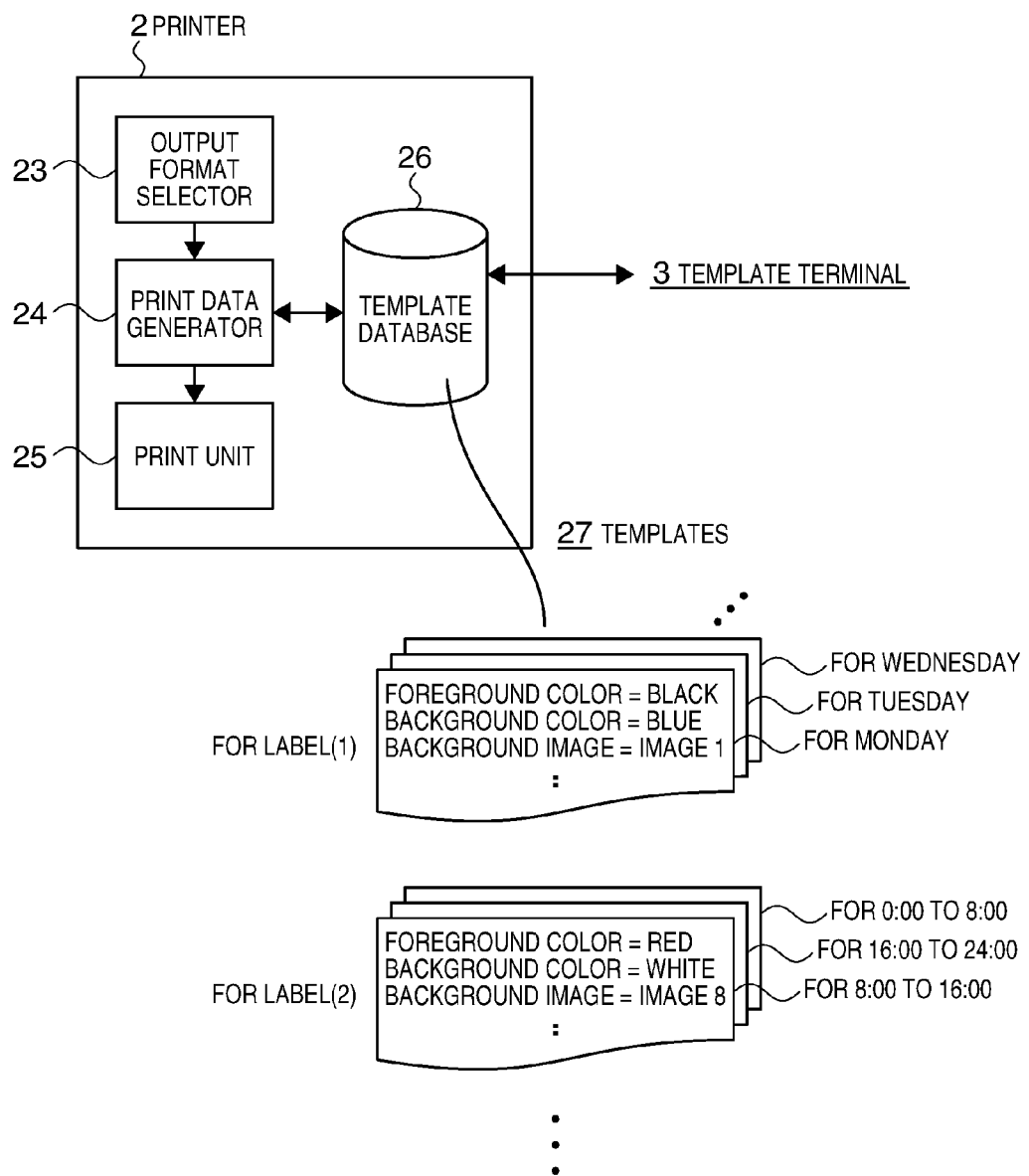
FIG. 2 is a basic block diagram of the printer 2.

FIG. 2 is a basic function block diagram of the printer 2. As shown in FIG. 2, the printer 2 functionally comprises an output format selector 23, a print data generator 24, a print unit 25, and a template database 26.

The output format selector 23 is the part that interprets the print data sent from the label terminal 1, and determines the template to use with the print data. The print data generator 24 is the part that generates data telling the print unit 25 to print using the print data and the selected template. The print unit 25 is the part that applies the printing process to the print medium according to the data sent from the print data generator 24. Note that the output format selector 23, print data generator 24, and template database 26 are disposed in the control unit 21, and the print unit 25 is disposed to the print mechanism 22.

Plural templates 27 are stored in the template database 26. Each template 27 (data) includes formatting information for the entire printout, including at least foreground color, background color, and background image information.

Each template 27 is prepared according to the type of label, which is the printout in this embodiment, and plural templates 27 that are used based on specific conditions are prepared for labels of the same type. In the example shown in FIG. 2, seven label (1) templates 27, one for each day of the week, are prepared for label (1), and three label (2) templates 27 that are selected according to the time of day are prepared for label (2). For example, when producing labels that are affixed to food products sold in a supermarket, label (1) is used when the color of the label is to be changed according to the manufacturing date, and label (2) is used for goods such as sandwiches or other perishables with an expiration date set to a specific time. Identification information is also added to each template 27.

By using these templates to print, the foreground color, background color, and background image are printed using the respectively specified colors and images as shown in FIG. 2, monochrome labels can be changed to color labels, and the same type of label can be printed with different colors determined by specific triggers.

As described above, the user creates new templates or edits existing templates in advance using the template terminal 3, and saves the templates 27 in the template database 26.

Figure 3:
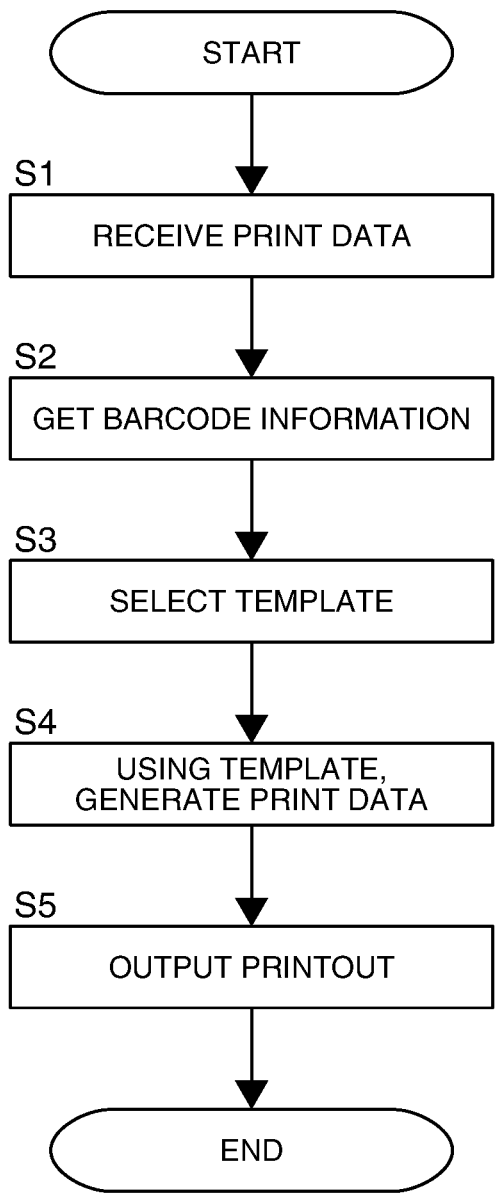
FIG. 3 is a flow chart of steps in a process executed by the printer 2 when printing.

The label printing system configured as described above according to this embodiment of the invention is distinguished by the process that is run by the printer 2 to change the output format, and specific steps in this process are described below. FIG. 3 is a flow chart of the steps in the process executed by the printer 2 during printing. To print, print data for printing a monochrome label is sent from the label terminal 1 and received by the printer 2 (step S1). This print data is written in a page description language (PDL) for a monochrome printer in the old system. The labels printed from this print data include a barcode, similarly to product labels that are affixed to food packages in a grocery store. See FIG. 4, for example.

The received print data is interpreted by the output format selector 23, and the output format selector 23 extracts the barcode information contained in the data based on the result of this interpretation (step S2). This barcode information typically includes such information as a product code identifying the type of product to which the label is applied, the date of manufacture, and an expiration date.

The output format selector 23 then determines which template 27 to use in the current print job based on the acquired information (step S3). More specifically, the output format selector 23 determines the type of label (label type) from the product code information acquired as described above. Based on the template 27 selection information that is defined for the identified label type, such as the date of manufacture information, the output format selector 23 then selects one of the templates 27 prepared for that label type, and determines the template 27 to be used.

In the example shown in FIG. 2, using a template 27 for label (2) is determined from the product code, and using the template 27 for Monday, for example, is then determined based on the date of manufacture.

The correlation between product code and label type, the correlation between the label type and information for selecting the appropriate template 27, and the correlation between this selection information and the template 27 to be used, can be stored in a lookup table for quick reference.

Identification information for the selected template 27 is then passed from the output format selector 23 to the print data generator 24, and the print data generator 24 runs the print data generating process using the selected template 27 (step S4).

More specifically, the print data generator 24 rasterizes (converts) the image data contained in the received print data to bitmap data, then accesses the template database 26, selects the selected template 27 from the above identification information, and acquires the formatting information. The print data generator 24 then changes the color of the image data and adds the background image according to the formatting information, and generates a bitmap of the final image to be printed on the printout.

For example, if the template 27 for Monday is used for label (1) in FIG. 2, the black part (such as text) of the image data (original image data) is left black based on the "foreground color=black" information contained in the formatting information, the white background of the original image is changed to blue based on the "background color=blue" information, and image 1 is superimposed on the background based on the "background image=image 1" information. The background image information could be stored as bitmap data in the template 27, or stored in a location that can be accessed by the print data generator 24 other than the template database 26.

The template 27 could also specify the foreground color for individual objects in the image. When this type of template 27 is used, the color of each object in the image is determined based on the specified foreground color before the original image data is converted to bitmap data, and the print data is then rasterized.

The print data generator 24 then applies a screen process to the resulting color bitmap data and converts the bitmap data to data representing whether a dot is formed for each color of ink, sends the resulting print data to the print unit 25, and tells the print unit 25 to print.

The print unit 25 then applies the printing process to the print medium according to the received print data, and a color printout (label) is output from the printer 2.

Figure 4A:
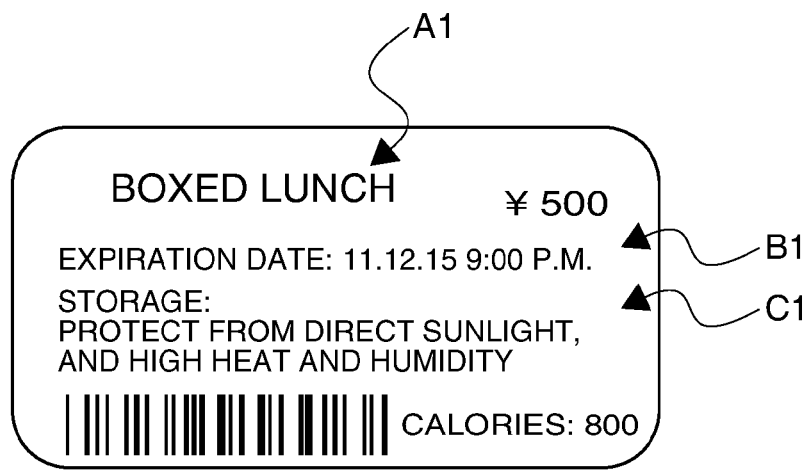
FIG. 4A shows an example of an output label.
Figure 4B:
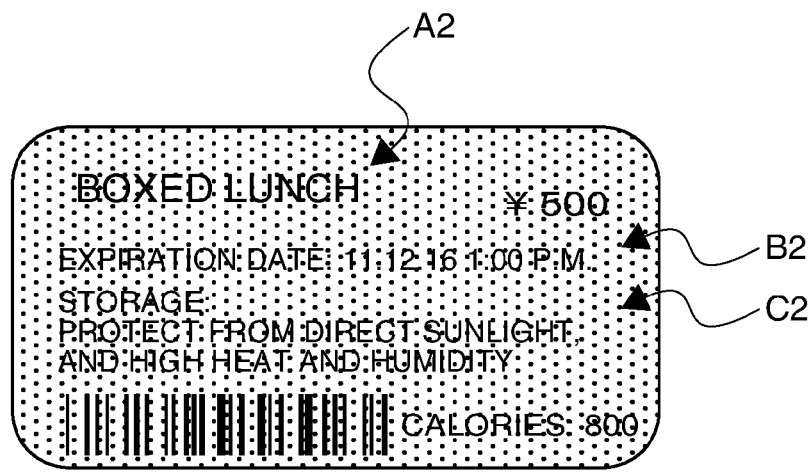
FIG. 4B shows another example of an output label.

FIG. 4A and FIG. 4B show examples of output labels. FIG. 4A and FIG. 4B show labels for food products for which the expiration date is determined by specific time periods, and the expiration dates differ in FIG. 4A and FIG. 4B even though the labels are the same type. In these examples the expiration date information acquired from the barcode data is the information used to select the template 27, and the labels in FIG. 4A and FIG. 4B are printed using different templates 27.

The label in FIG. 4A is printed using a template 27 in which the foreground color A1 is black, the background color B1 is white, and the background image C1 is blank. The label in FIG. 4B is printed using a template 27 in which the foreground color A2 is black, the background color B2 is yellow, and the background image C2 is a dot pattern. Labels with different output formats can thus be printed for food products that are the same but have expiration dates determined by the time of day.

A label output process that changes the output format in the printer 2 is thus executed.

The image produced from the print data received by the printer 2 in the above example assumes that the data is expressed in object units, but the image could be described by bitmap data. In this case, the output format selector 23 interprets the bitmap data using an image recognition process to acquire the barcode information and recognize the required objects.

While the image layout of the templates 27 is not described above, the template 27 could also contain formatting information describing the layout. In this implementation, the template 27 contains positioning information for each image object. In addition, the print data generator 24 determines the images to be used for the original image data by object unit, and processes each object according to the template 27. This enables also changing the layout of the printout.

Food labels are used for example in FIG. 4A and FIG. 4B and the foregoing description, but the label printing system of the invention can be used in a variety of applications that use an existing monochrome printing system. When used to produce labels that are attached to clothing, for example, the background color and background image could be changed according to the season. When used to produce shipping labels, labels with different formats could be produced based on such triggers as the shipping date, shipping destination, type of goods being shipped, and the urgency of delivery.

The printer 2 according to this embodiment of the invention can colorize and dynamically change the output format of originally monochrome printout based on time-related information, for example, and thereby improve the appearance of the printed output. As a result, the printer 2 can help prevent mistakes, improve job efficiency, and improve the customer's desire to buy particular goods.

Existing systems can also be upgraded relatively easily using the printer 2 according to the invention because the label terminal 1 and other parts of the existing system can continue to be used as shown in FIG. 1.

Acquiring the necessary information is also simple, and the information can be reliably acquired, because barcode information can be used to select which template 27 to use.

A system that is particularly user friendly can also be provided because the user can use the template terminal 3 to edit the templates 27 that are used.

The invention being thus described, it will be apparent that it may be varied in many ways. Such variations are not to be regarded as a departure from the spirit and scope of the invention, and all such modifications as would be apparent to one skilled in the art are intended to be included within the scope of the following claims.

What is claimed is:

1. A label printer that changes an output format of a generated printout based on received print data, the label printer comprising:

a controller configured to interpret information indicating an object in the printout, contained in the received print data, select a template based on the interpreted information, and change the received print data according to the selected template as the output format of the printout changes; and a print mechanism comprising a printhead and a conveyance unit, configured to print according to the print data changed by the controller.

2. The label printer described in claim 1, wherein:

the received print data is written in a page description language, and the controller interprets the information in the page description language.

3. The label printer described in claim 1, wherein:

the selected template specifies a color in the printout.

4. The label printer described in claim 1, wherein:

the received print data is data for monochrome printing.

5. A control method of a label printer that changes output format of a generated printout based on received print data, the control method comprising:

interpreting information indicating an object in the printout, contained in the received print data for the generated printout;

selecting a template for generating the generated printout based on the interpreted information;

changing the print data according to the selected template, as the output format of the generated printout changes; and printing according to the print data changed.

6. A method of changing an output format of a generated printout based on received print data comprising:

interpreting information indicating an object in the printout, contained in the received print data;

selecting a template based on the interpreted information;

changing the received print data according to the selected template; and printing according to the print data changed by the controller.

7. The method described in claim 6, wherein:

the received print data is written in a page description language, and the information is interpreted in the page description language.

8. The method described in claim 6, wherein:

the selected template specifies a color in the printout.

9. The method described in claim 6, wherein:

the received print data is data for monochrome printing.

* * * * *